(12) United States Patent
Piipponen et al.

(10) Patent No.: US 8,660,760 B2
(45) Date of Patent: Feb. 25, 2014

(54) METHOD FOR USING MINING VEHICLE, ARRANGEMENT IN MINE, ROCK DRILLING RIG, AND MINING VEHICLE

(75) Inventors: Juha Piipponen, Tampere (FI); Jukka Osara, Hämeenkyrö (FI); Jarno Kuittinen, Lempäälä (FI); Mikko Kouvo, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 265 days.

(21) Appl. No.: 13/130,821

(22) PCT Filed: Nov. 25, 2009

(86) PCT No.: PCT/FI2009/050954
§ 371 (c)(1),
(2), (4) Date: May 24, 2011

(87) PCT Pub. No.: WO2010/061058
PCT Pub. Date: Jun. 3, 2010

(65) Prior Publication Data
US 2011/0224859 A1    Sep. 15, 2011

(30) Foreign Application Priority Data
Nov. 26, 2008    (FI) ........................................ 20086134

(51) Int. Cl.
*H02J 7/00*     (2006.01)
*G06F 19/00*    (2011.01)

(52) U.S. Cl.
USPC ............... 701/50; 701/36; 175/195; 299/1.05

(58) Field of Classification Search
USPC ......... 701/50, 36; 320/104, 119; 175/195, 24; 191/45 R, 12 R; 299/1.05; 180/65.1, 275
See application file for complete search history.

(56) References Cited

U.S. PATENT DOCUMENTS 2,925,136 A    2/1960  Lee
3,718,367 A *  2/1973  Schumacher ................... 299/14
(Continued)

FOREIGN PATENT DOCUMENTS

JP    60-106302    6/1985
JP    6-197408     7/1994
(Continued)

OTHER PUBLICATIONS

Search Report dated Jul. 27, 2009 in corresponding Finnish Patent Application No. 20086134 (in Finnish).
(Continued)

*Primary Examiner* — Tan Q Nguyen
(74) *Attorney, Agent, or Firm* — Morgan, Lewis & Bockius LLP

(57) ABSTRACT

A method for using a mining vehicle, arrangement in a mine, rock drilling rig, and mining vehicle. Tasks according to a work cycle are performed at work sites with a mining work device in a mining vehicle. At the work site, the vehicle is connected to an external electrical network. An energy storage of the vehicle is charged during the work cycle defined by a excavation plan, when the vehicle is at a work site. After the work cycle is done, electricity obtained from the energy storage is used in a transfer drive.

24 Claims, 2 Drawing Sheets

(56) References Cited

U.S. PATENT DOCUMENTS

| | | | |
|---|---|---|---|
| 4,511,100 | A | 4/1985 | Oetringhaus |
| 5,423,654 | A * | 6/1995 | Rohrbaugh ............... 414/686 |
| 5,990,652 | A * | 11/1999 | Meisner .................. 318/687 |
| 6,470,989 | B1 * | 10/2002 | Puputti et al. ............ 180/275 |
| 2003/0151387 | A1 * | 8/2003 | Kumar ..................... 320/104 |
| 2004/0140112 | A1 * | 7/2004 | Salminen et al. ............. 173/1 |
| 2005/0040789 | A1 | 2/2005 | Salasoo et al. |
| 2007/0096538 | A1 * | 5/2007 | Niemi et al. ............ 299/1.05 |

FOREIGN PATENT DOCUMENTS

| | | |
|---|---|---|
| JP | 7-292722 | 11/1995 |
| JP | 8-282477 | 10/1996 |
| JP | 2002-359935 | 12/2002 |
| JP | 2008-231762 | 10/2008 |

OTHER PUBLICATIONS

International Preliminary Report on Patentability (under Chapter II) dated Dec. 3, 2010 for International Application No. PCT/FI2009/050954 filed Nov. 25, 2009.

Office Action issued Jul. 28, 2009 in corresponding Finnish Patent Application No. 20086134 (in Finnish).

Notice of Allowance in Finnish Patent No. 121769 dated Oct. 27, 2010 [issued Mar. 31, 2011].

"Green Car Congress, Caterpillar to Introduce Electric-Drive Mining Trucks," Tallennettu Internaeistä:<URL:http://www.greencarcongress.com/2008/09/caterpillar-to.html>[tallennettu Jul. 27, 2009], Sep. 22, 2008, pääjuttu; kommentit niimerkeiltä Reality Czech, Andrew, Josh C ja Tom Sep. 22-25, 2008.

Translation of Notification of Reason for Refusal for Japanese Application No. 2011-538015, dated Jan. 8, 2013.

* cited by examiner

METHOD FOR USING MINING VEHICLE, ARRANGEMENT IN MINE, ROCK DRILLING RIG, AND MINING VEHICLE

CROSS REFERNCE TO RELATED APPLICATIONS:

This application is the National Stage of International Application No. PCT/FI2009/050954, filed Nov. 25, 2009, and claims benefit of Finnish Application No. 20086134 filed Nov. 26, 2008, both of which are herein incorporated by reference in their entirety.

BACKGROUND OF THE INVENTION

The invention relates to a method, in which tasks according to a work cycle are performed with at least one mining work device in a mining vehicle at a work site. After the work cycle, the mining vehicle is driven from one work site to the next. At the work site, the mining vehicle is connected to an external electrical network for the required working power.

Further, the invention relates to an arrangement in a mine, rock drilling rig, and mining vehicle. The field of the invention is described in more detail in the preambles of the independent claims of the patent application.

In mines, rock drilling rig and corresponding mining vehicles equipped with mining work devices are used to perform operations according to the work cycles of the mining work devices at pre-planned work sites. After the necessary tasks, such as borehole drilling, according to the work cycle are performed, the mining vehicle is moved to the next work site and a new work cycle is started. In underground mines, in particular, mining vehicles are generally used, in which the driving energy for the operations according to the work cycle is electricity from an electrical network of the mine. Transfer drives may also be performed using energy from the electrical network of the mine, but then the transfer drive is hampered by electrical cables. Vehicles are also known, in which the transfer drives between work sites is performed by means of driving energy obtained using a combustion engine, typically diesel engine. However, exhaust gases and noise from a combustion engine cause problems in mines. Various hybrid-driven vehicles also comprise a combustion engine, which makes their use in mines questionable.

BRIEF DESCRIPTION OF THE INVENTION

It is an object of the present invention to provide a novel and improved method and arrangement for using a mining vehicle, a rock drilling rig, and a mining vehicle.

The method of the invention is characterised by using an energy storage located in the mining vehicle as energy source during transfer drives, and charging said energy storage with electricity obtained from an external electrical network during the work cycle.

The arrangement of the invention is characterised in that the mining vehicle comprises at least one energy storage that is arranged to store electrical energy required during transfer drives and that the system comprises charging means for charging the energy storage at the work site during the work cycle according to an excavation plan.

The rock drilling rig of the invention is characterised in that the rock drilling rig comprises at least one energy storage that is arranged to store electrical energy required during transfer drives and that the rock drilling rig comprises charging means for charging the energy storage at the same time as drilling is performed at the work site.

The mining vehicle of the invention is characterised in that the mining vehicle comprises at least one energy storage that is arranged to store electrical energy required during transfer drives and that the mining vehicle comprises charging means for charging the energy storage simultaneously with the work cycle performed with the mining work device at the work site.

The idea of the invention is that the mining vehicle is equipped with an energy storage and that electrical energy discharged from this energy storage is utilised in transfer drives. In addition, the energy storage is charged during the use of the mining work device, that is, during the work cycle, at the work site. The work cycle and work site are defined in advance in a excavation plan of the mine, contract work site or the like.

An advantage of the invention is that the combustion engine that generates noise and exhaust gases may be left out, which naturally improves the working conditions and work safety of the mine. In addition, the construction and layout of the mining vehicle is easier to arrange when the large combustion engine that requires lots of space around it may be left out. It is easier to position the energy storage on the carriage of the mining vehicle. Further, as the energy storage is charged during the often long-term work cycle, this time may be utilised and the vehicle need not be driven to a special charging station. As the charging is done during the work cycle, the energy storage is already charged when the transfer drive begins. It is also not necessary to arrange any separate charging stations to the electrical network of the mine or contract work site, since an electrical connection arranged for the work site is used.

The idea of an embodiment is that during the charging of the energy storage at least one mining work device and actuators required to drive it are used simultaneously. Thus, drilling or rock reinforcement, for instance, may be done simultaneously with the charging.

The idea of an embodiment is that at the work site, electrical energy from an external electrical network is supplied to the electrical system of the mining vehicle and one portion of this supplied electrical energy is distributed in the electrical system of the mining vehicle to the mining work device and a second portion to the charging device.

The idea of an embodiment is that the mining vehicle comprises at least one electric motor for performing the transfer drives. The electric motor may be part of the driving equipment. The electric motor may directly act on the axles of the drive wheels, in which case it may be an electric hub motor. Alternatively, the driving equipment may comprise an electromechanical or electro-hydraulic transmission, in which the drive power is generated with an electric motor.

The idea of an embodiment is that the transfer drive is done using only the energy in the energy storage.

The idea of an embodiment is that after a work cycle, first a short transfer drive is performed using energy obtained from an external electrical network, after which the supply cable is detached and a longer transfer drive is performed using only the energy in the energy storage. The mining vehicle may then first be driven away from the work site for detaching the connection cable.

The idea of an embodiment is that during a work cycle, the electrical power used by the mining work device and auxiliary systems is measured and the charging power of the energy storage is adjusted in relation to the input power of the work cycle. This arrangement makes it possible to balance the load of the electrical network of the mine and avoid its overload. When the work cycle requires a great deal of power, the charging power may be decreased and, correspondingly, when power requirement of the work cycle is low, the charging may take up more power.

The idea of an embodiment is that in normal use the energy storage of the mining vehicle may only be discharged using a predefined proportion of the total capacity of the energy storage, for instance a maximum of 20% of the full charging capacity.

The idea of an embodiment is that the mining vehicle comprises at least one control unit that is arranged to monitor and control the consumption of electricity and charging of the energy storage.

The idea of an embodiment is that one or more limits for the charge remaining in the energy storage may be set in the control unit of the mining vehicle. The control unit has a display device for displaying to the operator the charging limit and charge remaining in the energy storage.

The idea of an embodiment is that in special situations and with a special control command, the use of the mining vehicle is allowed even after the pre-set charging limit is reached. In such a case, it is provisionally possible to discharge from the energy storage a higher than normal charge, for instance 50% of the maximum capacity of the energy storage. This arrangement makes it possible to have a type of "reserve tank" for an electrically driven vehicle.

The idea of an embodiment is that the control unit of the mining vehicle comprises an on-board computer, with which the operator may obtain information for example on the route to be driven and work sites, tasks to be performed at the work sites and their estimated duration, the topography, length, and estimated electricity consumption of the next transfer drive, and information related to the monitoring of the energy storage and charging.

The idea of an embodiment is that potential energy of the mining vehicle is transformed into electrical energy during the transfer drive and that the energy storage is charged with this electricity. Potential energy is released when a vehicle moves to lower ground, that is, runs downhill. A vehicle usually needs to be decelerated when driven downhill, and the generated deceleration energy is utilised in charging.

The idea of an embodiment is that the route and difference in levels of the next transfer drive after the work cycle are taken into consideration. In addition, the amount of energy to be transformed from the potential energy of the mining vehicle to electrical energy is estimated and the maximum amount of energy to be charged to the energy storage is reduced taking into account the charging electricity obtained from deceleration energy. It is then possible to utilise as efficiently as possible the deceleration energy of the vehicle and reduce the charging electricity obtained from the electrical network of the mine. This saves energy costs. The operator may manually control the charging on the basis of the information of the next transfer drive. Alternatively, the control unit of the vehicle may be arranged to define the route of the next transfer drive and to adjust automatically the charging taking into consideration the route and downhill sections.

The idea of an embodiment is that the energy storage storing electricity is an battery, typically an electromechanical battery.

The idea of an embodiment is that the energy storage storing electricity is a capacitor.

The idea of an embodiment is that the mining vehicle is entirely without its own power unit for generating energy from fuel. The mining vehicle then has no combustion engine for generating energy required for driving, nor a combination of a combustion engine and generator for generating electrical energy. This simplifies the structure of the mining vehicle.

However, it should be noted that the mining vehicle may have means for generating electrical energy from kinetic energy.

The idea of an embodiment is that the mining vehicle comprises one or more of the following mining work devices: a rock drilling machine, bolting machine, shotcreting device, scaling device, injection device, blasthole charger, measuring device, or drilling, sealing and propellant feeding equipment used in small-charge excavation. The rock drilling machine may be a face drilling device, or a device used in production hole drilling, that is, a long-hole drilling device that drills boreholes in a fan-shape manner. The mining work device is an actuator used in handling undetached rock, which performs several consecutive operations according to a given work cycle. Typically, several similar operations are done with the mining work device at one work site. These operations may be defined in the excavation plan, such as a drilling plan, charging plan, or corresponding mining plan. The mining work device is normally arranged to a boom with which the tool is moved during the work cycle. On the other hand, the mining work device may be arranged to a corresponding support or support structure in a mining vehicle, which supports the tool during its work cycle.

The idea of an embodiment is that the mining vehicle is connected to the electrical network of the mine with just one supply cable, and the current in the electrical network is directed in the mining vehicle to charging means and electrical motors and devices required during the work cycle. The mining vehicle has means for directing the electricity supplied via the supply cable in a suitable manner in the electrical system of the mining vehicle to the actuators required to implement the work cycle and to the charging means for charging the energy storage. This arrangement does not cause any changes in the normal infrastructure of the mine.

The idea of an embodiment is that the mining vehicle or work site has separate supply cables for supplying the electricity required for the work cycle and the charging electricity.

The idea of an embodiment is that the mining vehicle comprises at least one converter that is arranged to convert and adjust the electricity supplied from the electrical network of the mine or from some other external electrical system to be suitable for the charging means and electric devices of the mining vehicle. The converter may for instance convert the voltage of the electrical network to be as required, filter voltage spikes or convert alternating current to direct current. One and the same mining vehicle is then suitable for use in mines equipped with different electrical systems.

The idea of an embodiment is that the mining vehicle is stationary at a work site. The mining vehicle is then positioned at the work site and its carriage is essentially stationary during the charging and the work cycle performed with the mining work device at the work site. The drive is then switched off so that the mining vehicle is not moved by it.

The idea of an embodiment is that the work cycle performed at a work site requires that the mining vehicle be positioned at least at two positions or locations at the work site to implement the work cycle according to the excavation plan. The positions may reside relatively close to each other inside the work site. For instance, the positions may reside at the same axial position of the tunnel line, that is, at the same peg number, but on different sides of the tunnel line. In fan-form drilling or rock bolting, one work site may also comprise two or more positions at a tunnel line-direction distance from each other. The work tasks required by the consecutive fans at the work site are then performed utilising the same electrical supply point that is arranged at the work site as required by the excavation plan.

BRIEF DESCRIPTION OF FIGURES

Some embodiments of the invention are described in greater detail in the attached drawings, in which.

In the figures, some embodiments of the invention are shown simplified for the sake of clarity. Similar parts are marked with the same reference numbers in the figures.

DETAILED DESCRIPTION OF SOME EMBODIMENTS OF THE INVENTION

Figures 1, 2:
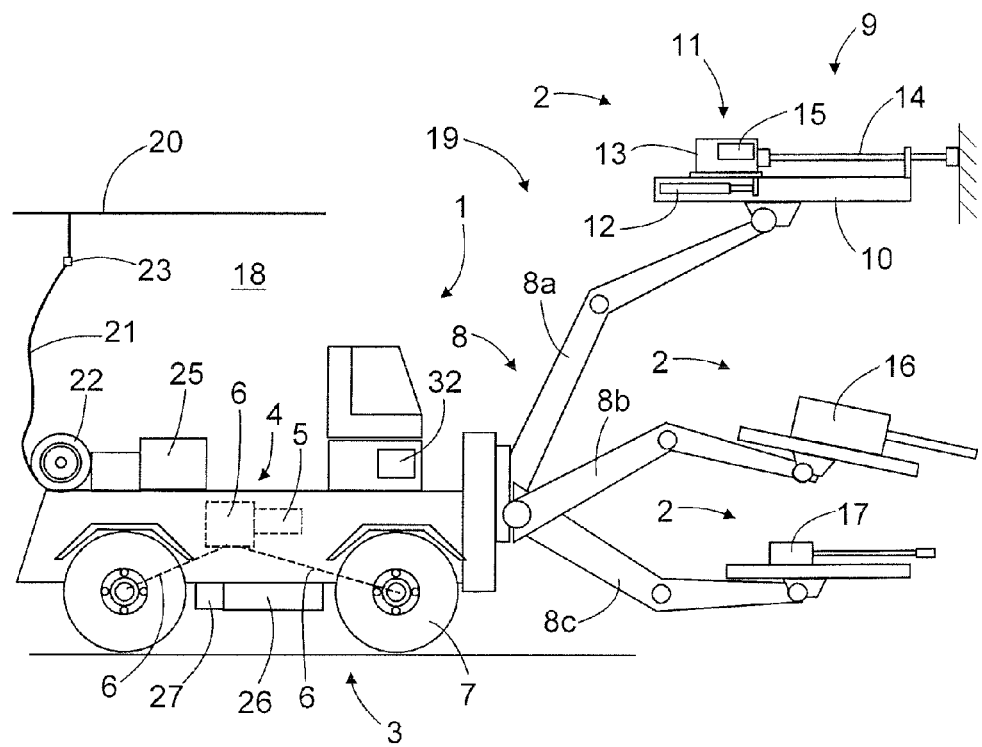
FIG. 1 is a schematic side representation of a mining vehicle, in this case a rock drilling rig.
FIG. 2 is a schematic representation of a route profile of the mining vehicle, the location of work sites, and the transfer drive between the work sites.

FIG. 1 shows a rock drilling rig that is one example of a mining vehicle 1 equipped with one or more mining work devices 2. The rock drilling rig comprises a carriage 3 that may be moved by means of drive equipment 4. The drive equipment 4 comprises one or more drive motors 5 and one or more power transmission means 6 for transmitting drive power to one or more wheels 7. The drive power transmission may comprise a mechanical gear system and mechanical power transmission members or, alternatively, the drive power transmission may be hydraulic or electric. There may be one or more booms 8 arranged on the carriage 3, and the boom may be equipped with a mining work device 2. In the embodiment shown in FIG. 1, the first boom 8a is a drilling boom, at the outermost end of which there is a rock drilling unit 9 comprising a feed beam 10, along which a rock drilling machine 11 may be moved by means of a feed device 12. The rock drilling machine 11 may comprise a percussion device 13 for generating impact pulses on the tool 14 and a rotating device 15 for rotating the tool 14 around its longitudinal axis. There may be several of these drilling booms 8a in the rock drilling rig. By way of example, a second boom 8b is shown to comprise a bolting device 16, with which rock bolts may be arranged in pre-drilled boreholes to support the excavated rock cavern. In the embodiment of FIG. 1, a third boom 8c is equipped with a measuring device 17 for measuring drilled boreholes. Other alternative mining work devices 2 are for example injection devices used in feeding sealing material into rock, shotcrete processing device, scaling equipment, devices used in small-charge excavation and blasthole chargers used in setting explosive charges. The mining vehicle 1 is run in accordance with the excavation plan of the mine 18 or a corresponding plan drafted in advance to a work site 19 where the mining work device 2 performs operations according to the work cycle, the performance of which takes a relatively long time. For instance, the work cycle of a rock drilling machine may include the drilling of several boreholes defined in the drilling plan at the work site 19. The drilling of each borehole typically consists of several work phases, such as collaring, actual drilling, changing extension rods and drill bit, and the dismantling of extension rod equipment after drilling. Performing a drilling work cycle at a work station 19 may take several hours, sometimes even an entire work shift. Correspondingly, charging, bolting, measuring, concrete spraying, and injecting are often also time-consuming operations. Generally, the use of a mining work device 2 has to do with drilling a borehole or further processing a finished hole. This then means handling undetached rock.

The position of the mining vehicle 1 at the work site 19 may also be defined in the excavation plan. In some cases, the work site may also be marked in advance on surfaces surrounding the work site, such as the walls of a tunnel. The mining vehicle 1 may be positioned or navigated accurately at the work site 19, after which the mining work device 2 may perform the tasks according to the work cycle, such as drilling several boreholes one after the other or equipping several drilled boreholes with rock bolts one after the other. The transfer drive takes place only after the tasks according to the excavation plan have been performed at the work site.

The work site 19 may be a location in the production tunnel of the mine, which is defined in the excavation plan by using what is known as the peg number. Further, the work site may be the face of the tunnel or a location defined in the rock cavern to be reinforced, into which several boreholes are drilled in fan-form and rock bolts are mounted in them.

FIG. 1 further shows that the mine 18 has an electrical network 20 that may be fixedly constructed, it may consist of a modifiable network. When the mining vehicle 1 is at the work site 19, its mining work device 2, hydraulic system and any necessary auxiliary systems are driven by electrical energy obtained from an external electrical network 20. In this patent application, the external electrical network 20 refers to an electrical network external to the electrical system of the mining vehicle 1. The electrical network of the mine or contract work site is designed according to the excavation plan so that it can supply electricity to a work site according to the excavation plan.

The external electrical network is, thus, not constructed to obtain an charging network that covers the entire area operated by the mining vehicle. The mining vehicle 1 may be connected to the electrical network 20 with one or more connection cables 21. The connection cable 21 may be arranged on a reel 22 and it may be equipped with a suitable connector 23 that may be connected to the supply connector of the electrical network 20. Alternatively, the reel 22 and cable 21 may be arranged in the mine 18, and the connection cable 21 is connected to the mining vehicle 1. The mining vehicle 1 may be equipped with converters 25, with which the electricity supplied from the electrical network 20 may be converted to suit the mining vehicle 1. This conversion may consist of converting the voltage to be suitable and converting alternating current to direct current and other electro-technical conversions. With the help of the converter 25, the mining vehicle 1 may be suitable for use in any mine 18 regardless of the properties and quality of its electrical network 20.

The mining vehicle 1 is also equipped with one or more energy storages 26, from which electric current may be discharged and which may correspondingly be charged with electric current. The energy storage 26 may be an battery, capacitor, or the like. Energy may be stored as a chemical or electrical charge. The energy storage 26 may supply electric current to the driving equipment 4 so that the mining vehicle 1 may be moved between work sites 19 without a combustion engine or connection to an external electrical network 20. In addition, the mining vehicle 1 may have a charging apparatus 27, with which the energy storage 26 may be charged by electricity from the electrical network 20.

When the mining vehicle 1 performs relatively time-consuming operations according to the work cycle at the work site 19, this time used at the work site 19 is utilised by simultaneously charging the energy storage 26 during the work cycle. When the work cycle at the work site 19 is finished, the energy storage 26 is also loaded and ready for the transfer drive. The vehicle need not be moved to a separate charging station.

FIG. 2 shows in a highly simplified manner a pre-planned driving route 28 of the mining vehicle 1 and its work sites 19. The profile of the driving route 28 may comprise even, uphill, and downhill sections. The transfer drive 29 between work sites 19 is done using electric current from the energy storage 26. Naturally, the capacity of the energy storage 26 lasts longer on even ground or downhill sections than on a route with uphill sections. The amount of charging to be done at each work site 19 may be set taking into consideration the length of the transfer drive 29 after the work site and the elevation profile of the route 28. The operator of the mining vehicle 1 may manually control the charging, or a control unit 32 may be arranged to automatically take into consideration in the charging control the energy requirement of the next transfer drive 29.

The electricity obtained from the energy storage may not only be used for the driving equipment, but also for driving the auxiliary equipment required during transfer drives. The auxiliary equipment and functions may include a hydraulic pump for generating the hydraulic pressure required for steering, the use of electric control units, ventilation and defrosting of the control room, driving lights, and corresponding systems.

The electricity from the energy storage may also be used at the work site in special circumstances. If the electricity supply of the electrical network is disconnected for some reason, the backup systems in the vehicle may be run by the energy from the energy storage. This way, it is for instance possible to lower the boom in a control manner.

The drive motor used in transfer drives may be a permanent magnet alternating-current motor. This type of AC drive motor is strong and efficient, and it may also be controlled accurately by means of a frequency converter. The traction motor can be a DC motor or a 3-phase synchronous, asynchronous or synchronous reluctance AC motor.

As seen in FIG. 2, the profile of the route 28 may have long downhill sections 31, where the vehicle 1 needs to be decelerated. The deceleration may be done using the driving equipment 4, in which case the electric motors belonging to it may be connected as generators and the generated electric current used to charge the energy storage 26. Any extra electric current may be directed to resistors and converted to heat. When the mining vehicle 1 moves on its route 28 to a lower level, potential energy is released which may be recovered to the energy storage 26 at least partly. This matter may be taken into consideration when dimensioning the amount of charging to be done at the work site 19b. The operator may reduce the charging at a work site, if s/he detects that the next transfer drive 29 comprises many downhill sections 31. Alternatively, the control unit 32 may automatically reduce the charging amount on the basis of route information.

Figure 3:
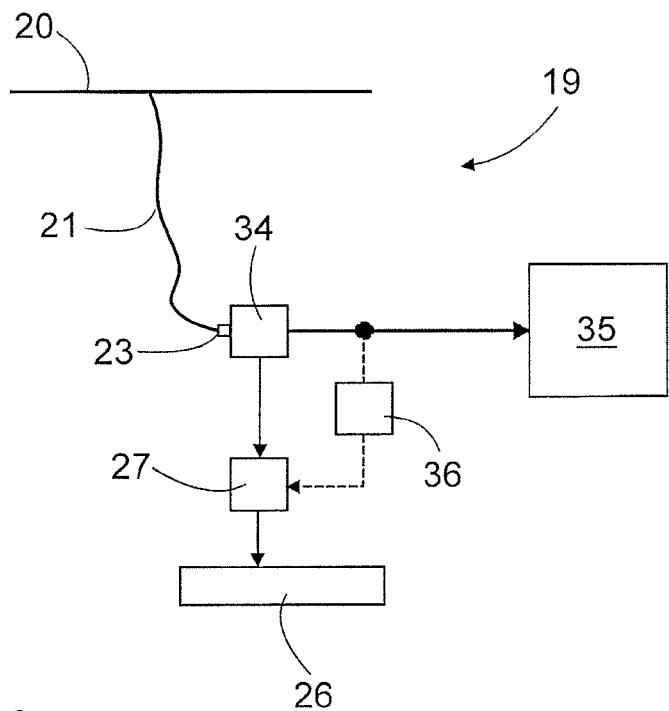
FIG. 3 is a schematic representation of means related to charging, and the monitoring of charging.

FIG. 3 shows an arrangement in which, at a work site 19, the electrical network 20 supplies electrical energy to input means 34 in the mining vehicle 1, which then direct electric current firstly to the actuators 35 required in the work cycle and secondly to the charging apparatus 27. The arrangement comprises a control unit 36 that is arranged to determine the electric power requirement caused by the work cycle and to adjust the charging apparatus 27 on the basis thereof. The charging power of the energy storage 26 is then adjusted in relation to the input power of the work cycle. This way, it is possible to balance the loads of the electrical network 20. A work cycle performed with a mining work device 2 has many periods with low power consumption. The charging power may be increased during these periods. Correspondingly, during full power drilling, for instance, the charging power may be reduced or charging even interrupted entirely.

The charging apparatus 27 may be an independent unit, or it may be integrated into the electric system of the vehicle. In this patent application, the charging apparatus and charging means refer to various electric devices, equipment, control means, connection members and other required equipment, with which the electricity of an electrical network may be supplied in a suitable form to an energy storage of a vehicle for charging.

Figure 4:
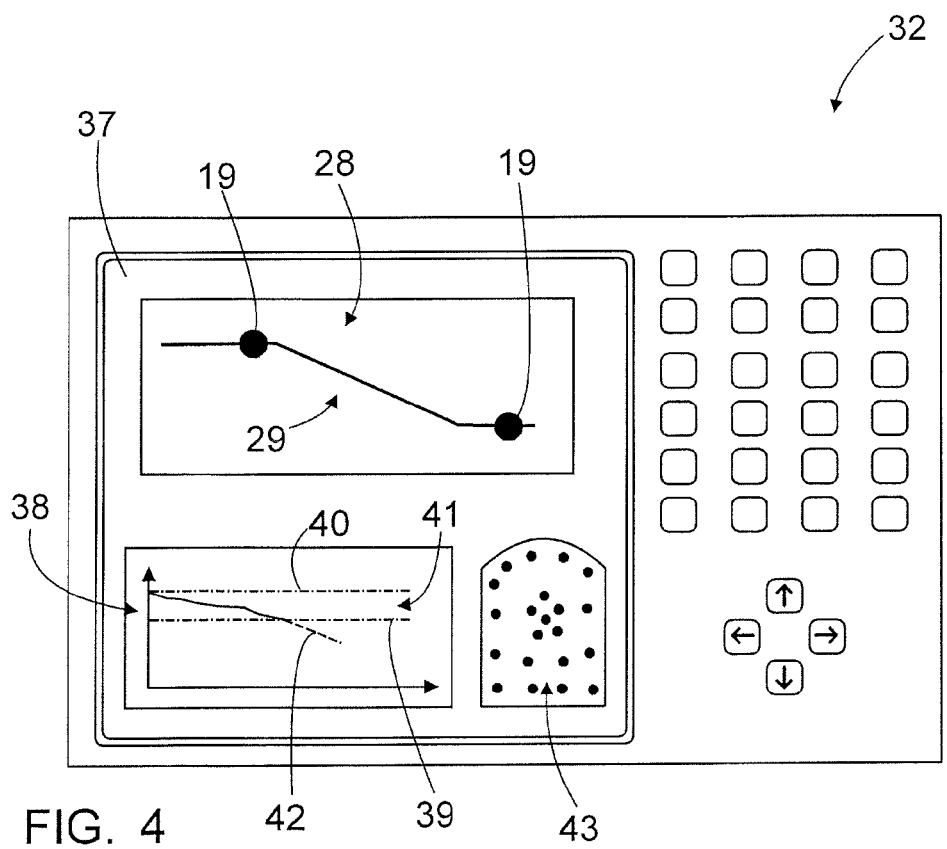
FIG. 4 is a schematic representation of a mining vehicle control unit, on the display of which information related to charging and use may be displayed.

FIG. 4 shows a control unit 32 of a mining vehicle, which may be equipped with a display device 37. The display device 37 may display in a versatile manner to the operator information related to the operation of the systems of the mining vehicle 1, the work cycle to be performed, and the transfer drive. By way of example, FIG. 4 shows that the display device 37 may display the profile of the route 28, location of the work sites 19 on the route, and distances, difference in levels, and estimated energy consumption of the transfer drive. Further, the charging state 38 of the energy storage 26 may be displayed in its own window. As can be seen, it is possible to set in the control unit a low limit 39 for the charging, which may normally not be undershot. The energy storage 26 is normally used in the range 41 between the maximum charge 40 and set low limit 39. The control unit may be arranged to generate an alarm, when the low limit 39 of charging is close, or the control unit may calculate in advance and indicate, whether the charging state of the energy storage 26 is sufficient for the transfer drive to be performed. Going under the low limit 39 of charging may be provisionally allowed by issuing a related command to the control unit. A larger than normal repeated discharge of the charge may cause a premature failure and decommissioning of the energy storage, but a temporary one does not significantly affect the service life of the energy storage. Thus, this arrangement may be used as a type of electric "reserve tank", which is illustrated by the dashed-line section 42 of the charging state curve in FIG. 4.

FIG. 4 also shows that the display device 37 may also display information related to the work cycle, such as drilling patterns 43, charging plans, and the like. In practice, the control unit 32 and display device 37 may form a type of on-board computer.

Situations are described above, in which the mining vehicle or rock drilling rig is first driven from one work site directly to the next. However, there are situations, in which the mining vehicle is driven from a work site to an intermediate location and only after this to the next work site. The intermediate location may be a service station, safe point, or the like. In some cases, it is also possible to charge the energy storage of the vehicle in the intermediate location.

The solutions described in the patent application may also be used when excavation tunnels. Tunnels are excavated in rounds. The work site is the face of the tunnel where boreholes are drilled and charged. Before the round is exploded, the rock drilling device is moved away from the face to a safe point. After the explosion and after the exploded rock is removed, the rock drilling rig is driven from the safe point back to the face of the tunnel to drill another round. Tunnels are excavated in rounds, which means that a new drilling site, that is, new work site, is at a distance corresponding to the length of the round from the previous drilling site, that is, previous work site. The transfer drive is then from the previous work site via the safe point to the next work site.

It should be mentioned that in this patent application, a mine refers to underground mines and opencast mines. Further, the method, mining vehicle, and rock drilling rig may be used at contract work sites, such as when excavating different rock caverns. Therefore, a contract work site may also be considered a type of mine. At contract work sites an external electrical network may be modifiable, such as an aggregate on a movable platform.

In some cases, the features disclosed in this patent application may be used as such, regardless of other features. On the other hand the features disclosed in this patent application may, when necessary, be combined to form various combinations.

The drawings and the related description are only intended to illustrate the idea of the invention. The invention may vary in detail within the scope of the claims.

The invention claimed is:

1. A method for using a mining vehicle, comprising:
    performing with at least one mining work device to drill a borehole or further process a finished hole in a mining vehicle tasks according to a work cycle defined in an excavation plan at a work site according to the excavation plan,
    connecting the mining vehicle at the work site to an external electrical network of the mine for supplying the required working energy for the at least one mining work device,
    performing after the work cycle a transfer drive of the mining vehicle,
    using an energy storage located in the mining vehicle as energy source during the transfer drive, and
    charging said energy storage with electricity obtained from the external electrical network during the work cycle,
    wherein the external electric network is a primary energy source for the mining vehicle,
    wherein the energy supplied from the external electric network of the mine is first directed to the mining work device for performing the tasks according to the work cycle and then directed to the energy storage for charging the energy storage such that the energy directed to the energy storage is adjusted in relation to the energy directed to the mining work device.

2. A method as claimed in claim 1, comprising:
    determining the electrical power requirement caused by the work cycle and
    adjusting the charging power of the energy storage in relation to the input power of the work cycle.

3. A method as claimed in claim 1, comprising:
    discharging the charge from the energy storage during a normal transfer drive only until a predefined charging limit, and
    allowing from the energy storage a larger discharge than the charge limit only in response to separate approval.

4. A method as claimed in claim 1, comprising:
    converting potential energy of the mining vehicle to electrical energy during the transfer drive and using it to charge the energy storage,
    estimating on the basis of the route information of the next transfer drive the energy amount to be converted from the potential energy of the mining vehicle into electrical energy, and
    reducing the amount of energy to be charged to the energy storage from the external electrical network during the work cycle in relation to the amount of charged energy to be generated from the potential energy.

5. A method as claimed in claim 1, comprising switching off the driving power transmission of the mining vehicle during the work cycle of the mining work device performed at the work site.

6. The method as claimed in claim 1, wherein the at least one mine working device is arranged to a boom with which the mine working device is moved during the work cycle.

7. The method as claimed in claim 1, wherein the excavation plan is a drilling plan.

8. The method as claimed in claim 1, wherein the mining vehicle is essentially stationary at the work site during the work cycle and during the charging.

9. The method as claimed in claim 1, wherein during the transfer drive the mining vehicle is disconnected from the external electric network.

10. The method as claimed in claim 1, wherein the mining vehicle is without a combustion engine for generating energy required for driving the mining vehicle.

11. The method as claimed in claim 1, wherein the mining vehicle is combustion engine-free.

12. The method as claimed in claim 1, wherein the transfer drive is done using only the energy in the energy storage located in the mining vehicle.

13. An arrangement in a mine, comprising:
    at least one mining vehicle equipped with at least one mining work device to drill a borehole or further process a finished hole and arranged to perform tasks according to a predefined work cycle with the mining work device at least at one work site according to an excavation plan in a mine,
    an electrical network of the mine,
    at least one set of connection means for connecting the mining vehicle to the electrical network for supplying the required operating power for the at least one mining work device, and
    the mining vehicle comprising driving equipment for performing a transfer drive after the work cycle,
    wherein the mining vehicle comprises at least one energy storage that is arranged to store electrical energy required for the transfer drive,
    wherein the system comprises charging means for charging the energy storage at the work site during the work cycle according to the excavation plan, and
    wherein the external electric network is a primary energy source for the mining vehicle,
    wherein the mining vehicle further comprises at least one control unit that is arranged to first direct the electricity supplied from the electrical network to the at least one mining work device to perform the tasks according to the work cycle and then direct the electricity supplied from the electrical network to the charging means for charging the energy storage such that the electricity directed to the charging means is adjusted in relation to the electricity directed to the at least one mining work device.

14. An arrangement as claimed in claim 13, wherein the system comprises a charging apparatus, and the work site is equipped with connection members for connecting the charging apparatus to the electrical network of the mine.

15. An arrangement as claimed in claim 13, wherein
    the system comprises a charging apparatus,
    the work site is equipped with connection members for connecting the charging apparatus to the electrical network of the mine; and
    in connection with the charging apparatus, there is the control unit arranged to determine the electrical power requirement caused by the work cycle and to control the charging power of the charging apparatus in relation to the input power of the work cycle.

16. An arrangement as claimed in claim 13, wherein the discharging of the charge in the energy storage in the mining vehicle during a transfer drive is limited, and a larger discharge is possible by using a separate command.

17. An arrangement as claimed in claim 13, wherein the mining vehicle comprises the at least one control unit that is arranged to determine the energy consumption for the next transfer drive, and
the control unit is arranged to control the charging apparatus automatically on the basis of the determined energy requirement or to issue to the operator charging instructions based on the energy requirement.

18. An arrangement as claimed in claim 13, wherein the mining vehicle is connected with one single connection cable to an electrical network external to its own electrical system, and
the mining vehicle comprises the at least one control unit that is arranged to direct the electricity supplied from the external electrical network in the electrical system of the mining vehicle to actuators of the mining work device required for the drilling work cycle and the charging means of the energy storage.

19. The arrangement as claimed in claim 13, wherein the at least one mine working device is arranged to a boom with which the mine working device is moved during the work cycle.

20. The arrangement as claimed in claim 13, wherein the excavation plan is a drilling plan.

21. The arrangement as claimed in claim 13, wherein the mining vehicle is without a combustion engine for generating energy required for driving the mining vehicle.

22. The arrangement as claimed in claim 13, wherein the mining vehicle is combustion engine-free.

23. A rock drilling rig that comprises:
a carriage,
driving equipment for moving the carriage,
at least one boom movable in relation to the carriage,
at least one rock drilling machine arranged on at least one boom,
at least one set of connection means, with which the rock drilling rig is connected at a work site to an external electrical network during rock drilling,
at least one energy storage that is arranged to store electrical energy required for a transfer drive, and
charging means for charging the energy storage simultaneously with the drilling at the work site,
wherein the rock drilling rig is provided with at least one control unit that is arranged to control electricity supplied from the external electrical network to actuators required for the rock drilling and the charging means of the energy storage, whereby the electricity supplied to the charging means of the energy storage is adjusted in relation to the electricity supplied to the actuators.

24. A mining vehicle that comprises:
a carriage,
driving equipment for moving the carriage,
at least one mining work device for performing at a work site tasks according to a work cycle defined in an excavation plan, the mining work device being one of the following: rock drilling machine, bolting device, shotcrete apparatus, scaling device, injection device, blasthole charger, measuring device,
at least one set of connection means connecting the mining vehicle at the work site to an external electrical network of the mine,
at least one energy storage that is arranged to store electrical energy required for the transfer drive, and
charging means for charging the energy storage simultaneously with the work cycle performed with the mining work device at the work site,
wherein the mining vehicle comprises at least one control unit that is arranged to first direct electricity supplied from the electrical network to the at least one mining work device to perform the tasks according to the work cycle and then direct the electricity supplied from the electrical network to the charging means for charging the energy storage such that the electricity directed to the charging means is adjusted in relation to the electricity directed to the at least one mining work device.

* * * * *